United States Patent
Eisentraeger et al.

(10) Patent No.: US 7,298,839 B2
(45) Date of Patent: Nov. 20, 2007

(54) SQUARED WEIL AND TATE PAIRING TECHNIQUES FOR USE WITH ELLIPTIC CURVES

(75) Inventors: Anne Kirsten Eisentraeger, Pasadena, CA (US); Kristin E. Lauter, Redmond, WA (US); Peter L. Montgomery, San Rafael, CA (US)

(73) Assignee: MIcrosoft Corporation, Redmond, WA (US)

(*) Notice: Subject to any disclaimer, the term of this patent is extended or adjusted under 35 U.S.C. 154(b) by 849 days.

(21) Appl. No.: 10/626,948

(22) Filed: Jul. 25, 2003

(65) Prior Publication Data

US 2005/0036609 A1 Feb. 17, 2005

(51) Int. Cl.
H04L 9/30 (2006.01)

(52) U.S. Cl. .................. 380/30; 380/28; 380/277
(58) Field of Classification Search .................. 380/30, 380/28
See application file for complete search history.

(56) References Cited

U.S. PATENT DOCUMENTS

| | | | |
|---|---|---|---|
| 5,272,755 | A | 12/1993 | Miyaji et al. |
| 6,968,354 | B2 | 11/2005 | Kaminaga et al. |
| 6,986,054 | B2 | 1/2006 | Kaminaga et al. |
| 7,079,650 | B1 | 7/2006 | Knudsen |
| 2003/0072443 | A1 | 4/2003 | Harley et al. |
| 2003/0081785 | A1* | 5/2003 | Boneh et al. ............ 380/277 |
| 2003/0182554 | A1* | 9/2003 | Gentry et al. ............ 713/171 |

OTHER PUBLICATIONS

J. Manoharmayum, on the Modularity of Certain GL2 (F7) Galois Representations, Mathematical Reasearch Letters 8, 703-712 (2001). and Revised version Retrieved date Oct. 25, 2006.*
IEEE Transactions on Information Theory, vol. 45, No. 5, Jul. 1999, pp. 1717-1719, Retrieved date Oct. 25, 2006.*
Eisentrager, Kirsten et al., "Fast Elliptic Curve Arithmetic and Improved Weil Pairing Evaluation," Topics in Cryptology, CT-RSA 2003, Marc Joye (Ed), pp. 343-354, LNCS 2612, Springer-Verlag, 2003.
Boneh, Dan, et al., "Identity-Based Encryption from the Weil Pairing," Siam J. Comput., vol. 32, No. 3, pp. 586-615, 2003 Society for Industrial and Applied Mathematics.
Menezes, Alfred J., et al., "Reducing Elliptic Curve Logarithms to Logarithms in a Finite Field," (0018-9448/93 1993 IEEE, IEEE Transactions on Information . . . ), 8 pages.
Frey, Gerhard et al., "A Remark Concerning m-Divisibility and the Discrete Logarithm in the Divisor Class Group of Curves," Mathematics of Computation, vol. 62, No. 206, Apr. 1994, pp. 865-874.

(Continued)

Primary Examiner—Gilberto Barron, Jr.
Assistant Examiner—Samson Lemma
(74) Attorney, Agent, or Firm—Lee & Hayes, PLLC

(57) ABSTRACT

Methods and apparati are provided for use in determining "Squared Weil pairings" and/or "Squared Tate Pairing" based on an elliptic curve, for example, and which are then used to support cryptographic processing of selected information. Significant improvements are provided in computing efficiency over the conventional implementation of the Weil and Tate pairings. The resulting Squared Weil and/or Tate pairings can be substituted for conventional Weil or Tate pairings in a variety of applications.

48 Claims, 4 Drawing Sheets

OTHER PUBLICATIONS

Hess, Florian et al., "Two Topics in Hyperelliptic Cryptography," S. Vaudenay & A. Youssef (Eds.): SAC 2001, LNCS 2259, pp. 181-189, 2001.

Boneh, Dan, et al., "Short signatures from the Weil pairing," pp. 1-17.

Galbraith, Steven D. et al., "Implementing the Tate Pairing," Mathematics Dept., Royal Holloway, University of London, Egham, Surrey, UK & Hewlett-Packard Laboratories, Bristol, Filton Road, Stoke Gifford, Bristol, UK, pp. 1-14.

Cantor, David G., "Computing in the Jacobian of a Hyperelliptic Curve," Mathematics of Computation, vol. 48, No. 177, Jan. 1987, pp. 95-101.

Barreto, Paulo S.L.M., et al., "Efficient Algorithms for Pairing-Based Cryptosystems," Universidade de Sao Paulo, Escola Politecnica, Sao Paulo (SP), Brazil & Computer Science Department, Stanford University, USA, pp. 1-16.

Joux, Antoine, "The Weil and Tate Pairings as Building Blocks for Public Key Cryptosystems (Survey),"C. Fieker and D.R. Kohel (eds.): ANTS 2002, LNCS 2369, pp. 20-32, 2002 (Springer-Verlag Berlin Heidelberg 2002).

Frey, et al., "The Tate Pairing and the Discrete Logarithm Applied to Elliptic Curve Cryptosystems", IEEE Transactions on Information Theory, vol. 45, No. 5, Jul. 1999, pp. 1717-1719.

Koblitz, "Elliptic Curve Cryptography", Jan. 5, 2007, at <<http://www.msri.org/publications/ln/msri/1998/crypt/koblitz/1/banner/01.html>>, MSRI, Jan. 11, 1998, pp. 1-34.

* cited by examiner

US 7,298,839 B2

SQUARED WEIL AND TATE PAIRING TECHNIQUES FOR USE WITH ELLIPTIC CURVES

RELATED PATENT APPLICATIONS

This patent application is related to co-pending U.S. patent application Ser. No. 10/627,281, titled "Improved Weil and Tate Pairing Techniques Using Parabolas", filed on Jul. 25, 2003.

TECHNICAL FIELD

This invention relates to cryptography, and more particularly to methods and apparati that implement improved processing techniques for Weil and Tate pairings using elliptic curves.

BACKGROUND

As computers have become increasingly commonplace in homes and businesses throughout the world, and such computers have become increasingly interconnected via networks (such as the Internet), security and authentication concerns have become increasingly important. One manner in which these concerns have been addressed is the use of a cryptographic technique involving a key-based cipher. Using a key-based cipher, sequences of intelligible data (typically referred to as plaintext) that collectively form a message are mathematically transformed, through an enciphering process, into seemingly unintelligible data (typically referred to as ciphertext). The enciphering can be reversed, allowing recipients of the ciphertext with the appropriate key to transform the ciphertext back to plaintext, while making it very difficult, if not nearly impossible, for those without the appropriate key to recover the plaintext.

Public-key cryptographic techniques are one type of key-based cipher. In public-key cryptography, each communicating party has a public/private key pair. The public key of each pair is made publicly available (or at least available to others who are intended to send encrypted communications), but the private key is kept secret. In order to communicate a plaintext message using encryption to a receiving party, an originating party encrypts the plaintext message into a ciphertext message using the public key of the receiving party and communicates the ciphertext message to the receiving party. Upon receipt of the ciphertext message, the receiving party decrypts the message using its secret private key, and thereby recovers the original plaintext message.

The RSA (Rivest-Shamir-Adleman) method is one well-known example of public/private key cryptology. To implement RSA, one generates two large prime numbers p and q and multiplies them together to get a large composite number N, which is made public. If the primes are properly chosen and large enough, it will be practically impossible (i.e., computationally infeasible) for someone who does not know p and q to determine them from knowing only N. However, in order to be secure, the size of N typically needs to be more than 1,000 bits. In some situations, such a large size makes the numbers too long to be practically useful.

One such situation is found in authentication, which can be required anywhere a party or a machine must prove that it is authorized to access or use a product or service. An example of such a situation is in a product ID system for a software program(s), where a user must hand-enter a product ID sequence stamped on the outside of the properly licensed software package as proof that the software has been properly paid for. If the product ID sequence is too long, then it will be cumbersome and user unfriendly.

Additionally, not only do software manufacturers lose revenue from unauthorized copies of their products, but software manufacturers also frequently provide customer support, of one form or another, for their products. In an effort to limit such support to their licensees, customer support staffs often require a user to first provide the product ID associated with his or her copy of the product for which support is sought as a condition for receiving support. Many current methods of generating product IDs, however, have been easily discerned by unauthorized users, allowing product IDs to be generated by unauthorized users.

Given the apparent ease with which unauthorized users can obtain valid indicia, software manufacturers are experiencing considerable difficulty in discriminating between licensees and such unauthorized users in order to provide support to the former while denying it to the latter. As a result, manufacturers often unwittingly provide support to unauthorized users, thus incurring additional and unnecessary support costs. If the number of unauthorized users of a software product is sufficiently large, then these excess costs associated with that product can be quite significant.

New curve-based cryptography techniques have recently been employed to allow software manufacturers to appreciably reduce the incidence of unauthorized copying of software products. For example, product IDs have been generated using elliptic curve cryptographic techniques. The resulting product IDs provide improved security. Curve-based cryptographic techniques may also be used to perform other types of cryptographic services.

As curve-based cryptosystems grow in popularity, it would be useful to have new and improved techniques for performing the computations associated with the requisite mathematical operations. Hence, there is a continuing need for improved mathematical and/or computational methods and apparati in curve-based cryptosystems.

SUMMARY

Methods and apparati are provided for determining "Squared Weil pairings" and/or "Squared Tate pairings" based on an elliptic curve, for example, and which are then used to support cryptographic processing of selected information. Significant improvements are provided in computing efficiency over conventional implementations of the Weil and Tate pairings. The resulting Squared Weil and/or Tate pairings can be substituted for conventional Weil or Tate pairings in a variety of applications.

The above stated needs and/or others are met, for example, by a method that includes selecting an elliptic curve, determining a Squared Weil pairing based on the elliptic curve, and cryptographically processing selected information based on the Squared Weil pairing.

Here, for example, an elliptic curve E over a field K may be used, wherein E can be represented as an equation $y^2 = x^3 + ax + b$. The method may then include establishing a point id that is defined as a point at infinity on E, and wherein P, Q, R, X are points on E wherein X is an indeterminate denoting an independent variable of a function, and wherein $x(X)$, $y(X)$ are functions mapping the point X on E to its affine x and y coordinates, and wherein a line passes through any three points P, Q, R which satisfy P+Q+R=id. Note, as used herein, a bold + or − operator denotes arithmetic in the elliptic curve group, whereas a normal + or − operator denotes arithmetic in the field K or in the integers.

In certain implementations, P and Q are m-torsion points on E and m is an odd prime, and the method further includes determining the squared Weil pairing based on $$\frac{f_{m,P}(Q)f_{m,Q}(-P)}{f_{m,P}(-Q)f_{m,Q}(P)} = -e_m(P,Q)^2,$$

where $e_m$ denotes the Weil-pairing.

Another exemplary method includes determining a Squared Weil Pairing $e_m(P, Q)^2$ by establishing an odd prime m and a curve E; and based on two m-torsion points P and Q on E, computing $e_m(P, Q)^2$. In certain further implementations, the method also includes forming a mathematical chain for m. For example, an addition chain or an addition-subtraction chain may be formed such that every element in the mathematical chain is a sum or difference of two earlier elements in the mathematical chain, which continues until m is included.

Then, for example, for each j in the mathematical chain, a tuple
$t_j = [jP, jQ, n_j, d_j]$ is formed such that $$\frac{n_j}{d_j} = \frac{f_{j,P}(Q)f_{j,Q}(-P)}{f_{j,P}(-Q)f_{j,Q}(P)}.$$

In accordance with still other exemplary implementations, another method includes determining a Squared Weil pairing (m, P, Q), where m is an odd prime number, by setting $t_1 = [P, Q, 1, 1]$, using an addition-subtraction chain to determine $t_m = [mP, mQ, n_m, d_m]$, and if $n_m$ and $d_m$ are nonzero, then determining:

$$\frac{n_m}{d_m} = \frac{f_{m,P}(Q)f_{m,Q}(-P)}{f_{m,P}(-Q)f_{m,Q}(P)};$$

and cryptographically processing selected information based on the Squared Weil pairing.

Another exemplary method includes selecting an elliptic curve, determining Squared Tate pairing based on the elliptic curve, and cryptographically processing selected information based on the Squared Tate pairing. Here, for example, an elliptic curve E over a field K with $q = p^n$ elements may be used, wherein E can be represented as an equation $y^2 = x^3 + ax + b$. Letting m be an odd prime dividing q−1 and P be an m-torsion point on E. Let $Q \neq id$ be a point on E. If P is not equal to a multiple of Q, the method may further include determining $$\left(\frac{f_{m,P}(Q)}{f_{m,P}(-Q)}\right)^{\frac{q-1}{m}} = v_m(P,Q),$$

where $v_m$ denotes the squared Tate-pairing.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Introduction

The discussions herein assume a basic understanding of cryptography by the reader. For a basic introduction to cryptography, the reader is directed to a book written by Bruce Schneier and entitled "Applied Cryptography: Protocols, Algorithms, and Source Code in C," published by John Wiley & Sons with copyright 1994 (or second edition with copyright 1996).

Described herein are techniques that can be used with a curve-based cryptosystem, and in particular elliptic curve-based cryptosystems. In certain examples, the techniques take the form of methods and apparati that can be implemented in logic within one or more devices. One such device, for example, is a computing device that is configured to perform at least a portion of the processing required for a particular cryptographic capability or application.

The techniques provided herein can be implemented and/or otherwise adapted for use in a variety of cryptographic capabilities and applications. By way of example, the techniques may be employed to support: key generation logic, e.g., for one-round three-way key establishment applications; identity-based encryption logic; short signature logic, e.g., product identifier logic; and/or other like cryptographic logic.

The term logic as used herein is meant to include any suitable form of logic that may be employed. Thus, for example, logic may include hardware, firmware, software, or any combination thereof.

The term curve-based cryptosystem as used herein refers to logic that at least partially provides for curve-based encryption and/or decryption using key(s) that are generated based at least partially on aspects or characteristics of an elliptic curve or other like curve.

Such curve-based cryptosystems can be used to encrypt any of a wide variety of information. Here, for example, one exemplary cryptosystem is described primarily with respect to generation of a short signature or product identifier, which is a code that allows validation and/or authentication of a machine, program, user, etc. The signature is a "short" signature in that it uses a relatively small number of characters.

Figure 1:
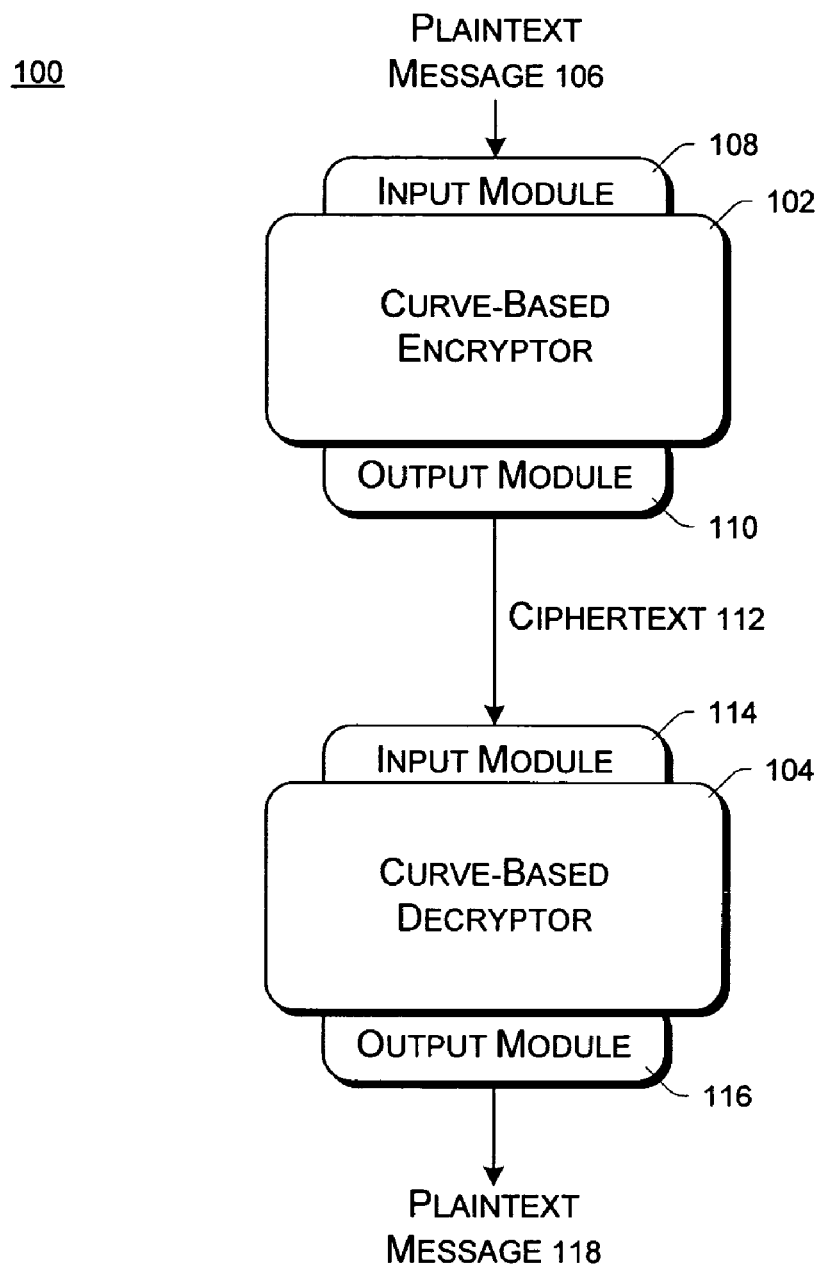
FIG. 1 is a block diagram illustrating an exemplary cryptosystem in accordance with certain implementations of the present invention.

With this in mind, attention is drawn to FIG. 1, which is a block diagram illustrating an exemplary cryptosystem 100 in accordance with certain implementations of the present invention. Cryptosystem 100 includes an encryptor 102 and a decryptor 104. A plaintext message 106 is received at an input module 108 of encryptor 102, which is a curve-based encryptor that encrypts message 106 based on a public key generated based on a secret known by decryptor 104. Plaintext message 106 is typically an unencrypted message, although encryptor 102 can encrypt any type of message/ data. Thus, message 106 may alternatively be encrypted or encoded by some other component (not shown) or a user.

An output module 110 of encryptor 102 outputs the encrypted version of plaintext message 106, which is ciphertext 112. Ciphertext 112 can then be communicated to decryptor 104, which can be implemented, for example, on a computer system remote from a computer system on which encryptor 102 is implemented. Given the encrypted nature of ciphertext 112, the communication link between encryptor 102 and 104 need not be secure (it is typically presumed that the communication link is not secure). The communication link can be any of a wide variety of public and/or private networks implemented using any of a wide variety of conventional public and/or proprietary protocols, and including both wired and wireless implementations. Additionally, the communication link may include other non-computer network components, such as hand-delivery of media including ciphertext or other components of a product distribution chain.

Decryptor 104 receives ciphertext 112 at input module 114 and, being aware of the secret used to encrypt message 106, is able to readily decrypt ciphertext 112 to recover the original plaintext message 106, which is output by output module 116 as plaintext message 118. Decryptor 104 is a curve-based decryptor that decrypts the message based on the same curve as was used by encryptor 102.

Encryption and decryption are performed in cryptosystem 100 based on a secret, such as points on the elliptic curve. This secret is known to decryptor 104, and a public key generated based on the secret is known to encryptor 102. This knowledge allows encryptor 102 to encrypt a plaintext message that can be decrypted only by decryptor 104. Other components, including encryptor 102, which do not have knowledge of the secret cannot decrypt the ciphertext (although decryption may be technically possible, it is not computationally feasible). Similarly, decryptor 104 can also generate a message using the secret and based on a plaintext message, a process referred to as digitally signing the plaintext message. This signed message can then be communicated to other components, such as encryptor 102, which can in turn verify the digital signature based on the public key.

Figure 2:
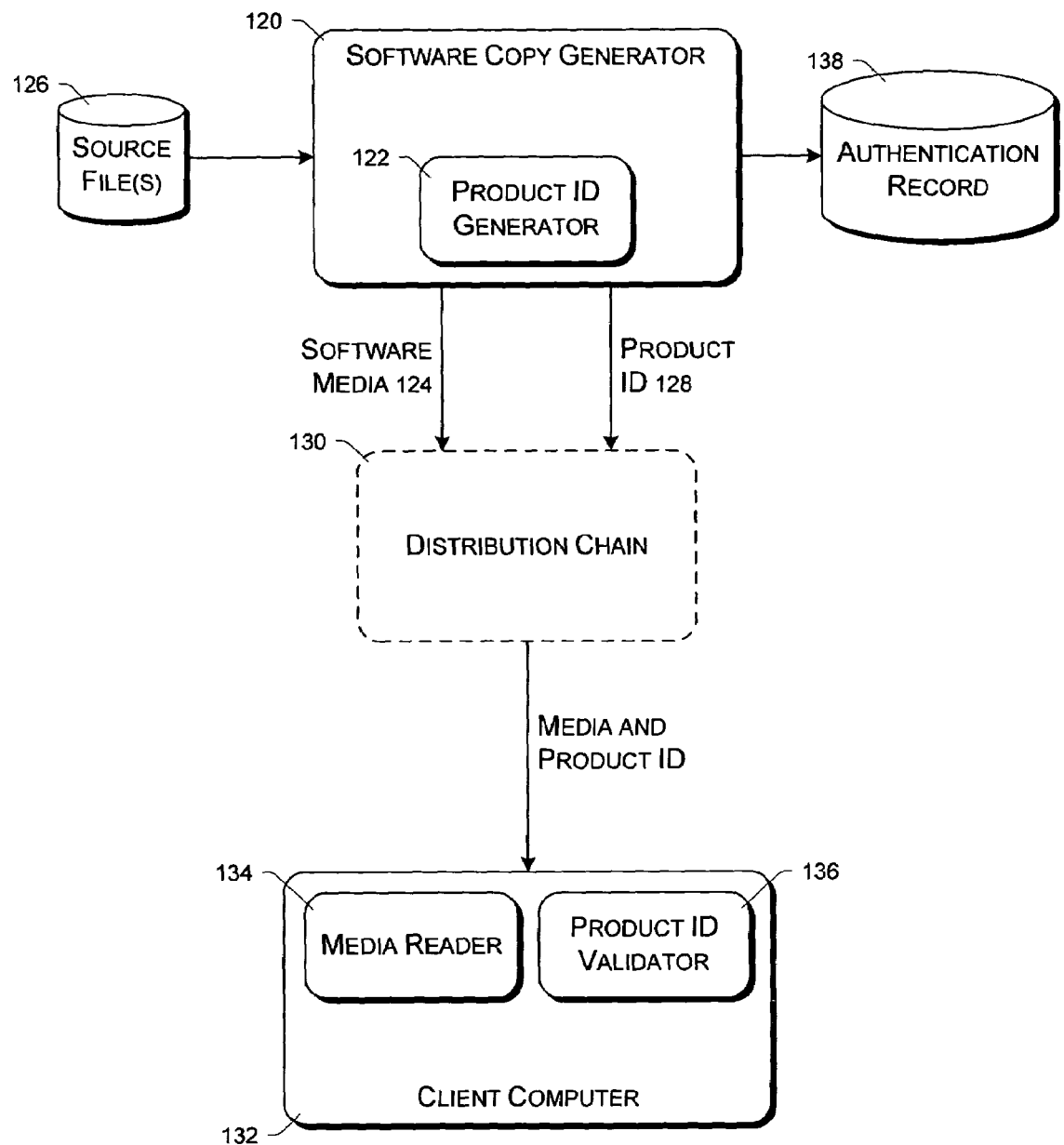
FIG. 2 illustrates an exemplary system using a product identifier to validate software in accordance with certain implementations of the present invention.

FIG. 2 illustrates an exemplary system using a product identifier to validate software in accordance with certain implementations of the present invention. FIG. illustrates a software copy generator 120 including a product identifier (ID) generator 122. Software copy generator 120 produces software media 124 (e.g., a CD-ROM, DVD (Digital Versatile Disk)) that contains typically all the files needed to collectively implement a complete copy of one or more application programs, (e.g., a word processing program, a spreadsheet program, an operating system, a suite of programs). These files are received from source files 126, which may be a local source (e.g., a hard drive internal to generator 120), a remote source (e.g., coupled to generator 120 via a network), or a combination thereof. Although only a single generator 120 is illustrated in FIG. 2, typically multiple such generators operate individually and/or cooperatively to increase the rate at which software media 124 can be generated.

Product ID generator 122 generates a product ID 128 that can include numbers, letters, and/or other symbols. Generator 122 generates product ID 128 using the curve-based encryption techniques described herein. The product ID 128 is typically printed on a label and affixed to either a carrier containing software media 124 or a box into which software containing software media 124 is placed. Alternatively, the product ID 128 may be made available electronically, such as a certificate provided to a user when receiving a softcopy of the application program via an on-line source (e.g., downloading of the software via the Internet). The product ID can serve multiple functions. First, the product ID can be cryptographically validated in order to verify that the product ID is a valid product ID (and thus allowing, for example, the application program to be installed). Additionally, the product ID can optionally serve to authenticate the particular software media 124 to which it is associated.

The generated software media 124 and associated product ID 128 are then provided to a distribution chain 130. Distribution chain 130 represents any of a variety of conventional distribution systems and methods, including possibly one or more "middlemen" (e.g., wholesalers, suppliers, distributors, retail stores (either on-line or brick and mortar), etc.). Regardless of the manner in which media 124 and the associated product ID 128 are distributed, eventually media 124 and product ID 128 are purchased (e.g., licensed), by the user of a client computer 132.

Client computer 132 includes a media reader 134 capable of reading software media 124 and installing the application program onto client computer 132 (e.g., installing the application program on to a hard disk drive (not shown) of client computer 132). Part of this installation process involves entry of the product ID 128. This entry may be a manual entry (e.g., the user typing in the product ID via a keyboard), or alternatively an automatic entry (e.g., computer 132 automatically accessing a particular field of a license associated with the application program and extracting the product ID there from). Client computer 132 also includes a product ID validator 136 which validates, during installation of the application program, the product ID 128. This validation is performed using the curve-based decryption techniques.

If validator 136 determines that the product ID is valid, then an appropriate course of action is taken (e.g., an installation program on software media 124 allows the application to be installed on computer 132). However, if validator 136 determines that the product ID is invalid, then a different course of action is taken (e.g., the installation program terminates the installation process preventing the application program from being installed).

Product ID validator 136 also optionally authenticates the application program based on the product ID 128. This authentication verifies that the product ID 128 entered at computer 132 corresponds to the particular copy of the application being accessed. The authentication can be performed at different times, such as during installation, or when requesting product support or an upgrade. Alternatively, this authentication may be performed at a remote location (e.g., at a call center when the user of client computer 132 calls for technical support, the user may be required to provide the product ID 128 before receiving assistance).

If the application program manufacturer desires to utilize the authentication capabilities of the product ID, then the product ID generated by generator 122 for each copy of an application program is unique. This uniqueness is created by assigning a different initial number or value to each copy of the application program. This initial value can then be used as a basis for generating the product ID.

The unique value associated with the copy of the application program can be optionally maintained by the manufacturer as an authentication record 138 (e.g., a database or list) along with an indication of the particular copy of the application program. This indication can be, for example, a serial number embedded in the application program or on software media 124, and may be hidden in any of a wide variety of conventional manners.

Alternatively, the individual number itself may be a serial number that is associated with the particular copy, thereby allowing the manufacturer to verify the authenticity of an application program by extracting the initial value from the product ID and verifying that it is the same as the serial number embedded in the application program or software media 124.

Appropriate action can be taken based on whether the product ID is authenticated. These actions can vary, depending on the manufacturer's desires and/or action being taken at computer 132 that caused the authentication check to occur. For example, if a user is attempting to install an application program then installation of the program may be allowed only if the authentication succeeds. By way of another example, the manufacturer's support technicians may provide assistance to a user of computer 132 only if the authentication succeeds, or an upgrade version of the application program may be installed only if authentication of the previous version of the application program succeeds.

The logic of certain curve-based cryptosystems utilizes what are commonly referred to as "Weil and Tate pairings" during a signature verification process when using elliptic curves. The Weil and Tate pairings have been proposed for use in many aspects of cryptography. They may be used, for example, to form efficient protocols to do one-round three-way key establishment, identity-based encryption, short signatures, and the like.

It is important, however, given the amount of processing to have efficient implementations of the Weil and Tate pairings to cut down on the cost of implementing these protocols. Computation of the Weil or Tate pairing in conventional cryptosystems typically follows "Miller's algorithm", which is described, for example, in "Identity-Based Encryption From The Weil Pairing", by Dan Boneh and Matthew Franklin, published in SIAM J. of Computing, Vol. 32, No. 3, pp. 586-615, 2003.

As is well-known, for a fixed positive integer m, the Weil pairing $e_m$ is a bilinear map that takes as input two m-torsion points on an elliptic curve, and outputs an $m^{th}$ root of unity. For elliptic curves, as is well-known, the Tate pairing is related to the Weil pairing by the fact that the Weil pairing is a quotient of the output of two applications of the Tate pairing. The algorithms for these pairings depend on constructing rational functions with a prescribed pattern of poles and zeros.

The Miller algorithm as typically implemented in conventional curve-based cryptosystems calls for the evaluation of the Weil or Tate pairing by evaluating a function at two selected points on the elliptic curve, wherein one of the points is formed from a "random" point selected using a randomly generated input. Unfortunately, there is a chance that the Miller algorithm will essentially fail with some random input values, due to a division by zero. When the Miller algorithm fails, then the logic will usually need to rerun the Miller algorithm using a different random input value. Although the failure rate of the Miller algorithm tends to be fairly low, if it is required to be run thousands or millions of times, eventually the processing delays may become significant. Also, if the computations are performed in a parallel processing environment, the completions may be slowed or delayed as some of the processing pipelines or the like are required to rerun the Miller algorithm. Real-time applications, which have rigid bounds on maximum computation time rather than average computation time, may not be able to afford the reruns.

The improved techniques described herein provide increased efficiency and an alternative method to the standard methods which have been proposed. For example, in accordance with certain aspects of the present invention, the improved techniques do not require a randomly chosen m-torsion point as described above and as such always generate a correct answer.

With this exemplary improvement in mind, in the following sections an improved algorithm is described for computing what is hereby referred to as the "squared Weil pairing", $e_m(P, Q)^2$. With the squared Weil pairing, one may obtain a significant speed-up over the standard implementation of the Weil pairing (Miller's algorithm). While the Tate pairing is already more efficient to implement than the Weil pairing, the improved techniques herein can also be employed in an improved algorithm for computing the "squared Tate pairing" for elliptic curves. The squared Weil pairing and/or the squared Tate pairing can be substituted for the Weil or Tate pairings in any of the above applications.

By way of further reference, other exemplary curve-based cryptosystems are provided in the following references: "Short Signatures from the Weil Pairing", by Dan Boneh, et al., in *Advances in Cryptography—Asiacrypt* 2001, Lecture Notes in Computer Science, Vol. 2248, Springer-Verlag, pp. 514-532; and, "The Weil and Tate Pairings as Building Blocks for Public Key Cryptosystems (Survey)", by Antoine Joux, in *Algorithmic Number Theory, 5<sup>th</sup> International Symposium ANTS-V, Sydney, Australia, July* 2002 *proceedings, Claus Fieker and David R. Kohel (Eds)*, Lecture Notes in Computer Science, Vol. 2369, Springer-Verlag, pp. 20-32.

Figure 3:
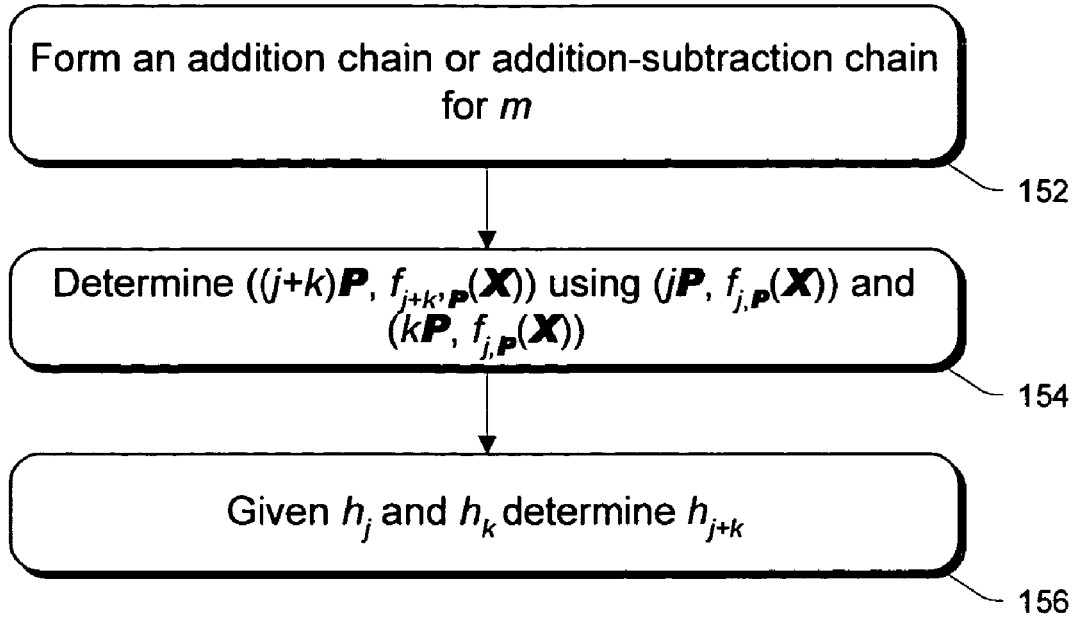
FIG. 3 illustrates an exemplary process for use in curve-based cryptosystems in accordance with certain implementations of the present invention.

Attention is now drawn to FIG. 3, which is a flow diagram illustrating an exemplary process 150 for use in comparing the Weil and Tate pairings for elliptic curves. In act 152, an addition chain, addition-subtraction chain, or the like, is formed for m, wherein m is an integer greater than zero and an m-torsion point P is fixed on an elliptic curve E. In act 154, ((j+k)P, $f_{j+k,P}(X)$) is determined using (jP, $f_{j,P}(X)$) and (kP, $f_{k,P}(X)$), wherein j and k are integers, jP, kP and (j+k)P are multiples of point P and $f_{j,P}(X)$, $f_{k,P}(X)$ and $f_{j+k,P}(X)$ are functions in the indeterminate X, and ((j+k)P, $f_{j+k,P}(X)$) represents an iterative building block for forming the output of the pairing via a chain. With Weil pairing, for example, ((j+k)P, $f_{j+k,P}(X)$) can also be run with P replaced by another m-torstion point Q, i.e., ((j+k)Q, $f_{j+k,Q}(X)$). In act 156, $h_{j+k}$ is determined given $h_j$ and $h_k$, wherein $h_j$, $h_k$ and $h_{j+k}$ are field elements and for example, $$h_j = f_{j,P}(Q_1)/f_{j,P}(Q_2)$$

for certain points $Q_1$ and $Q_2$ (independent of j) on E and the goal is to compute $h_m$. In conventional Miller algorithms $Q_1$ and $Q_2$ are random value inputs.

In certain improvements provided herein, for example, an improved algorithm essentially produces:

$$h'_j := f_{j,P}(Q)/f_{j,P}(-Q)$$

wherein $-Q=id-Q$ is the complement of Q. When the elliptic curve is given as $E: y^2 = x^3 + ax + b$, then the complement of a point is the reflection of the point over the x-axis, which for an elliptic curve is the additive inverse of the point.

In accordance with certain aspects of the present invention, an improvement is made to act 156 wherein squared Weil pairing is introduced. In accordance with certain further aspects of the present invention, an improvement is made to a subprocess of act 154 wherein a parabola is introduced for computing Weil and Tate pairings in a manner that reduces the number of computation steps required. Improved cryptosystems may implement either one or both of these aspects of the present invention.

Squared Weil Pairing for Elliptic Curves

The purpose of this section is to construct a new pairing, referred to as squared Weil pairing, which has the advantage of being more efficient to compute than Miller's algorithm for the original Weil pairing. The improved algorithm presented herein has the advantage that it is guaranteed to output the correct answer since it does not depend on inputting a randomly chosen m-torsion point. As mentioned earlier, certain conventional implementations of Miller's algorithm sometimes require more than one iteration of the algorithm, since the randomly chosen m-torsion point may cause the algorithm to fail at times.

Let E: $y^2 = x^3 + ax + b$ be an elliptic curve over a field K, not of characteristic 2 or 3. Characteristic 2 and 3 can be handled by introducing the more general equation for an elliptic curve.

Introducing some further notation, let:

id be the point at infinity on E;

P, Q, R, X (capitals) be points on E, wherein X is an indeterminate denoting the (main) independent variable of a function;

$x(X)$, $y(X)$ be (rational) functions mapping a point X on E to its (affine) x and y-coordinates;

Let line $(P, Q, R)(X)$ denote the equation of the line (linear in $x(X)$ and $y(X)$) passing through three points P, Q, R on E, which satisfy $P+Q+R=id$, and wherein when two of P, Q, R are equal, this is a tangent line at that common point.

Function $f_{j,P}$ and its Construction

If j is an integer and P a point on E, then $f_{j,P}$ and $f_{j,P}(X)$ will refer to a rational function on E whose divisor of zeros and poles is:

$(f_{j,P}) = j(P) - (jP) - (j-1)(id)$, where parentheses around a point on E indicate that it is being considered formally as a point on E. If $j>1$ and P, jP, and id are distinct, then $f_{j,P}(X)$ has a j-fold zero at X=P, a simple pole at X=jP, a (j-1)-fold pole at infinity (i.e., at X=id), and no other poles or zeros.

The theory of divisors states that $f_{j,P}$ exists and is unique up to a nonzero scale factor (multiplicative constant). If $Q_1$ and $Q_2$ are given, then the quotient $f_{j,P}(Q_1)/f_{j,P}(Q_2)$ is well-defined unless a division by zero occurs.

When $j=0$ or $j=1$, $f_{j,P}$ can be any nonzero constant.

If one knows $f_{j,P}$ and $f_{k,P}$ for two integers j and k, then a simple, well-known, construction gives $f_{-j-k,P}$. One wants $f_{-j-k,P}$ to satisfy $(f_{-j-k,P} f_{j,P} f_{k,P}) = (f_{-j-k,P}) + (f_{j,P}) + (f_{k,P}) = 3(id) - ((-j-k)P) - (jP) - (kP)$.

This will be satisfied if we choose $f_{-j-k,P}$ so that:

$f_{-j-k,P}(X) f_{j,P}(X) f_{k,P}(X) \text{line}(jP, kP, (-j-k)P)(X) = \text{constant}$.

Then repeating this construction on $f_{0,P}$ and $f_{-j-k,P}$ gives $f_{j+k,P}$. The line through $0P=id$, $(-j-k)P$, and $(j+k)P$ is vertical (i.e., its equation does not reference the y-coordinate). This results in the useful constructions $$f_{j+k,P}(X) = f_{j,P}(X) f_{k,P}(X) \frac{\text{line}(jP, kP, (-j-k)P)(X)}{\text{line}(id, (-j-k)P, (j+k)P)(X)}$$

$$f_{j-k,P}(X) = \frac{f_{j,P}(X) \text{line}(id, jP, -jP)(X)}{f_{k,P}(X) \text{line}(-jP, kP, (j-k)P)(X)}$$

Other possibly useful formulae include:

$f_{j,id}$=constant;

$f_{j,-P}(X) = f_{j,P}(-X) * $(constant);

If $(P+Q+R=id)$, then:

$$f_{j,P}(X) f_{j,Q}(X) f_{j,R}(X) = \frac{\text{line}(P, Q, R)(X)^j}{\text{line}(jP, jQ, jR)(X)}.$$

Squared Weil-Pairing Formula

Let m be an odd prime. Suppose P and Q are m-torsion points on E, with neither being the identity and P not equal to $\pm Q$.

Then $$\frac{f_{m,P}(Q) f_{m,Q}(-P)}{f_{m,P}(-Q) f_{m,Q}(P)} = e_m(P, Q)^2$$

where $e_m$ denotes the Weil-pairing.

Exemplary Algorithm for $e_m(P, Q)^2$

Fix an odd prime m and the curve E. Given two m-torsion points P and Q on E, one needs to compute $e_m(P, Q)^2$.

In accordance with certain exemplary implementations of the present invention, the algorithm includes forming an addition or addition-subtraction chain for m. That is, after an initial 1, every element in the chain is a sum or difference of two earlier elements in the chain, until an m appears. Well-known techniques, give a chain of length $O(\log(m))$.

For each j in the addition-subtraction chain, form a tuple $t_j = [jP, jQ, n_j, d_j]$ such that $n_j$ and $d_j$ are field elements such that $$\frac{n_j}{d_j} = \frac{f_{j,P}(Q) f_{j,Q}(-P)}{f_{j,P}(-Q) f_{j,Q}(P)}.$$

Keeping track of the numerators and denominators separately until the end is optional.

To do this, start with $t_1 = [P, Q, 1, 1]$. Given $t_j$ and $t_k$, this procedure gets $t_{j+k}$:

form elliptic curve sums: $jP+kP=(j+k)P$ and $jQ+kQ=(j+k)Q$;

find line: $\text{line}(jP, kP, (-j-k)P)(X) = c0+c1*x(X)+c2*y(X)$;

find line: $\text{line}(jQ, kQ, (-j-k)Q)(X) = c0'+c1'*x(X)+c2'*y(X)$.

Set:

$n_{j+k} = n_j * n_k * (c0+c1*x(Q)+c2*y(Q)) * (c0'+c1'*x(P)-c2'*y(P))$ and $d_{j+k} = d_j * d_k * (c0+c1*x(Q)-c2*y(Q)) * (c0'+c1'*x(P)+c2'*y(P))$.

A similar construction gives $t_{j-k}$ from $t_j$ and $t_k$. Observe that the vertical lines through (j+k)P and (j+k)Q do not appear in the formulae for $n_{j+k}$ and $d_{j+k}$, this is because the contributions from Q and −Q (or from P and −P) are equal. Here −Q is the complement of Q and −P is the complement of P.

When j+k=m, one can further simplify this to $n_{j+k}=n_j*n_k$ and $d_{j+k}=d_j*d_k$, since c2 and c2' will be zero.

Pseudocode may take the following form, for example:

```
procedure Squared_Weil_Pairing(m, P, Q)
    issue an error if m is not an odd prime.
    if (P = id or Q = id or P = ±Q) then
        return 1;
    else
        t₁ = [P, Q, 1, 1];
        use an addition-subtraction chain to get
            tₘ=[mP, mQ, nₘ, dₘ].
        issue an error if mP or mQ is not id.
        if (nₘ = 0 or dₘ = 0) then
            return 1;
        else
            return −nₘ/dₘ;
        end if;
    end if;
```

When $n_m$ and $d_m$ are nonzero, then the computation $$\frac{n_m}{d_m} = \frac{f_{m,P}(Q)f_{m,Q}(-P)}{f_{m,P}(-Q)f_{m,Q}(P)}$$

has been successful, and the output is correct. If, however, some $n_m$ or $d_m$ is zero, then some factor such as c0+c1*x(Q)+c2*y(Q) must have vanished. That line was chosen to pass through jP, kP, and (−j−k)P, for some j and k.

This factor does not vanish at any other point on the elliptic curve. Therefore this factor can vanish only if Q=jP or Q=kP or Q=(−j−k)P for some j and k. In all of these cases Q will be a multiple of P, ensuring that $$e_m(P, Q)=1.$$

Squared Tate Pairing For Elliptic Curves

Squared Tate Pairing Formula

Let m be an odd prime. Suppose P is an m-torsion point on E, and Q is a point on the curve, with neither being the identity and P not equal to a multiple of Q. Assume that E is defined over K, where K has $q=p^n$ elements and suppose m divides q−1. Then $$\left(\frac{f_{m,P}(Q)}{f_{m,P}(-Q)}\right)^{\frac{q-1}{m}} = v_m(P, Q)$$

where $v_m$ denotes the squared Tate-pairing.

Exemplary Algorithm For $v_m(P, Q)$

Fix an odd prime m and the curve E. Given an m-torsion point P on E and a point Q on E, one needs to compute $v_m(P, Q)$.

As before, one starts with an addition or addition-subtraction chain for m.

For each j in the addition-subtraction chain, one then forms a tuple $$t_j=[jP, n_j, d_j]$$

such that $$\frac{n_j}{d_j} = \frac{f_{j,P}(Q)}{f_{j,P}(-Q)}.$$

Keeping track of the numerators and denominators separately until the end is optional.

Start with $t_1$=[P, 1, 1]. Given $t_j$ and $t_k$, to get $t_{j+k}$:
form the elliptic curve sum jP+kP=(j+k)P;
find line(jP, kP, (−j−k)P)(X)=c0+c1*x(X)+c2*y(X);
set:

$$n_{j+k}=n_j*n_k*(c0+c1*x(.)+c2*y(Q))$$

and $$d_{j+k}=d_j*d_k*(c0+c1*x(Q)-c2*y(Q)).$$

A similar construction gives $t_{j-k}$ from $t_j$ and $t_k$. Observe that the vertical lines through (j+k)P and (j+k)Q do not appear in the formulae for $n_{j+k}$ and $d_{j+k}$, because the contributions from Q and −Q are equal. When j+k=m, one can further simplify this to:

$$n_{j+k}=n_j*n_k \text{ and } d_{j+k}=d_j*d_k,$$

since c2 will be zero.

When $n_m$ and $d_m$ are nonzero, then the computation $$\frac{n_m}{d_m} = \frac{f_{m,P}(Q)}{f_{m,P}(-Q)}$$

has been successful, and after raising to the (q−1)/m power, one will have the correct output. If, however, some $n_m$ or $d_m$ is zero, then some factor such as c0+c1*x(Q)+c2*y(Q) must have vanished. That line was chosen to pass through jP, kP, and (−j−k)P, for some j and k. It does not vanish at any other point on the elliptic curve. Therefore this factor can vanish only if Q=jP or Q=kP or Q=(−j−k)P for some j and k. In all of these cases Q will be a multiple of P.

Figure 4:
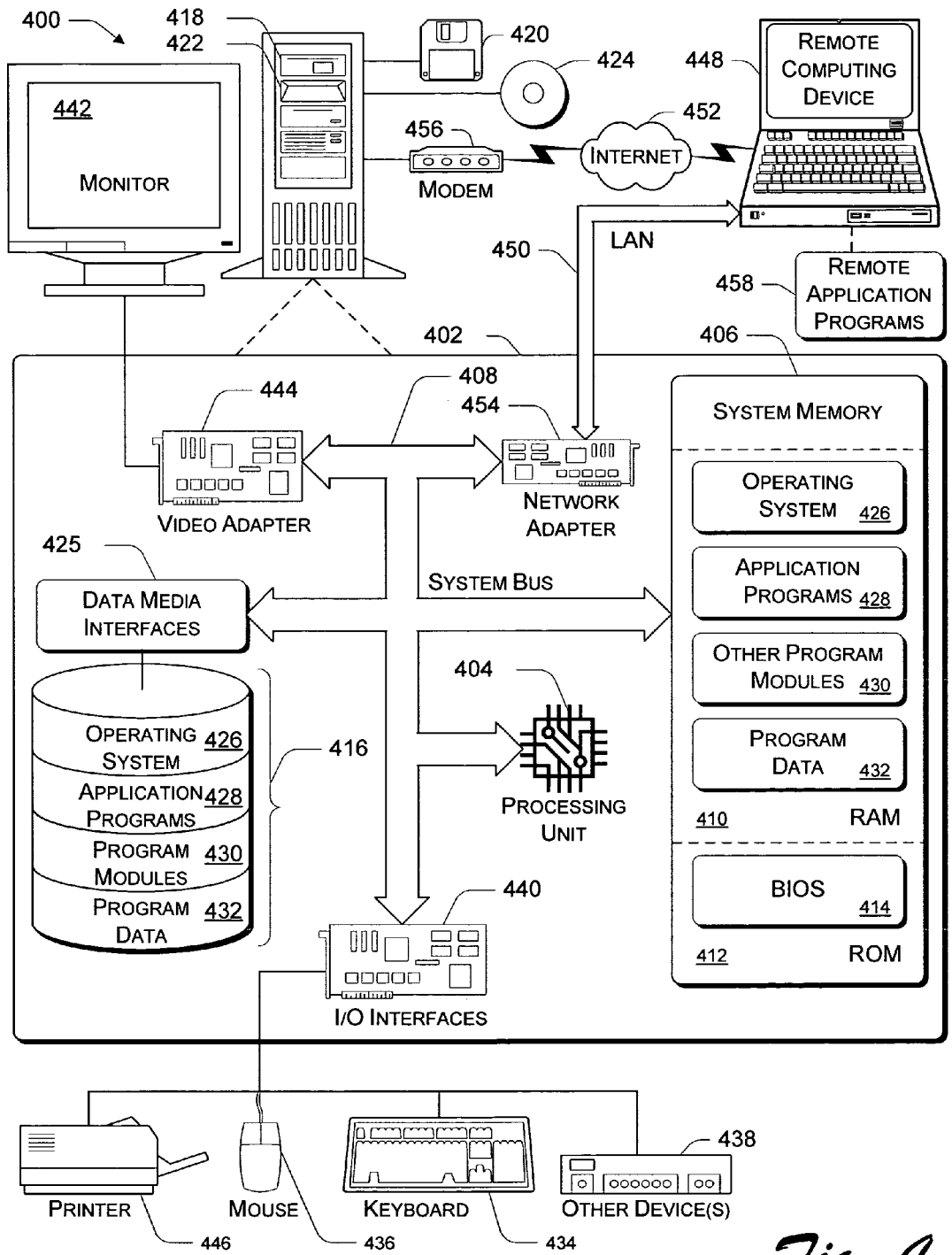
FIG. 4 illustrates a more general exemplary computer environment which can be used in various implementations of the invention.

The above techniques may be implemented through various forms of logic, including, for example, a programmed computer. Hence, FIG. 4 illustrates a more general exemplary computer environment 400, which can be used in various implementations of the invention. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can implement, for example, encryptor 102 or decryptor 104 of FIG. 1, generator 120 or client computer 132 of FIG. 2, either or both of modules 152 and 153 of FIG. 3, and so forth. Computer 402 represents any of a wide variety of computing devices, such as a personal computer, server computer, hand-held or laptop device, multiprocessor system, microprocessor-based system, programmable consumer electronics (e.g., digital video recorders), gaming console, cellular telephone, network PC, minicomputer, mainframe computer, distributed computing environment that include any of the above systems or devices, and the like.

The components of computer 402 can include, but are not limited to, one or more processors or processing units 404, a system memory 406, and a system bus 408 that couples various system components including the processor 404 to the system memory 406. The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 425. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Computer 402 typically includes at least some form of computer readable media. Computer readable media can be any available media that can be accessed by computer 402. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 402. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as wired network or direct-wired connection, and wireless media such as acoustic, RF, infrared and other wireless media. Combinations of any of the above should also be included within the scope of computer readable media.

The invention has been described herein in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various implementations.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, smartcard, and/or firmware. For example, one or more application specific integrated circuits (ASICs) could be designed or programmed to carry out the invention.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method comprising:
   selecting an elliptic curve;
   determining a Squared Weil pairing based on the elliptic curve, wherein the elliptic curve includes an elliptic curve E over a field K, wherein E can be represented as an equation $y^2=x^3+ax+b$;
   wherein determining the Squared Weil pairing based on the elliptic curve further includes establishing a point id that is defined as a point at infinity on E, and wherein P, Q, R, X are points on E wherein X is an indeterminate denoting an independent variable of a function, and wherein x(X), y(X) are functions mapping the point X on E to its affine x and y coordinates, and wherein a line passes through the points P, Q, R if P+Q+R=id;
   wherein determining the Squared Weil pairing based on the elliptic curve further includes:
   with a first function $f_{j,P}$ and a second function $f_{k,P}$ for two integers j and k, deriving a third function $f_{-j-k,P}$ based on the first and second functions;
   cryptographically processing selected information based on the Squared Weil pairing;
   outputting validation of selected information based on the Squared Weir pairing; and
   determining a course of action in response to validation of selected information.

2. The method as recited in claim 1, wherein when at least two of said P, Q, R points are equal, said line is a tangent line at a common point.

3. The method as recited in claim 1, wherein $(f_{-j-k,P}f_{j,P}f_{k,P})=(f_{-j-k,P})+(f_{j,P})+(f_{k,P})=3(\text{id})-((-j-k)P)-(jP)-(kP)$.

4. The method as recited in claim 1, wherein $f_{-j-k,P}(X) f_{j,P}(X) f_{k,P}(X) \text{line}(jP, kP, (-j-k)P)(X) = $ a constant.

5. The method as recited in claim 1, wherein if j is an integer and P a point on E, then said first and second functions are rational functions on E whose divisor of zeros and poles is $(f_{j,P})=j(P)-(jP)-(j-1)(\text{id})$.

6. The method as recited in claim 5, wherein if j>1 and P, jP, and id are distinct, then said first function has a j-fold zero at X=P, a simple pole at X=jP, a (j−1)-fold pole at infinity, and no other poles or zeros.

7. The method as recited in claim 5, wherein if j equals 0 or 1 then said first function is a nonzero constant.

8. The method as recited in claim 1, further comprising determining $f_{0,P}$ such that a line through 0P=id, (−j−k)P, and (j+k)P is vertical in that its equation does not reference a y-coordinate.

9. The method as recited in claim 8, wherein:

$$f_{j+k,P}(X) = f_{j,P}(X)f_{k,P}(X)\frac{\text{line}(jP, kP, (-j-k)P)(X)}{\text{line}(\text{id}, (-j-k)P, (j+k)P)(X)}, \text{ and}$$

$$f_{j-k,P}(X) = \frac{f_{j,P}(X)\text{line}(\text{id}, jP, -jP)(X)}{f_{k,P}(X)\text{line}(-jP, kP, (j-k)P)(X)}.$$

10. The method as recited in claim 8, wherein:
$f_{j,\text{id}}$=constant;
$f_{j,-P}(X)=f_{j,P}(-X)*(\text{constant})$; and
if (P+Q+R=id), then:

$$f_{j,P}(X)f_{j,Q}(X)f_{j,R}(X) = \frac{\text{line }(P, Q, R)(X)^j}{\text{line }(jP, jQ, jR)(X)}.$$

11. The method as recited in claim 1, wherein P and Q are m-torsion points on E and m is an odd prime, and wherein determining said Squared Weil pairing further includes:
   determining said squared Weil pairing based on $$\frac{f_{m,P}(Q)f_{m,Q}(-P)}{f_{m,P}(-Q)f_{m,Q}(P)} = e_m(P, Q)^2,$$

where $e_m$ denotes the Weil-pairing.

12. The method as recited in claim 11, wherein neither P nor Q is an identity and P is not equal to ±Q.

13. A computer storage media having computer-implementable instructions for causing at least one processing unit to perform acts comprising:
   determining a Squared Weil pairing based on an elliptic curve, wherein said elliptic curve includes an elliptic curve E over a field K, wherein F can be represented as an equation $y^2=x^3+ax+b$;
   determining the Squared Weil pairing based on the elliptic curve further includes establishing a point id that is defined as a point at infinity on E, and wherein P, Q, R, X are points on E wherein X is an indeterminate denoting an independent variable of a function, and wherein x(X), y(X) are functions mapping said point X on E to its affine x and y coordinates, and wherein a line passes through said points P, Q, R if P+Q+R=id;
   wherein determining the Squared Weil pairing based on the elliptic curve further includes:
   determining a first function $f_{j,P}$ and a second function $f_{k,P}$ for two integers j and k; and
   determining a third function $f_{-j-k,P}$ based on the first and second functions
      cryptographically processing selected information based on the Squared Weil pairing;
   outputting validation of selected information based on the Squared Weil pairing and determining a course of action in response to the validation of selected information.

14. The computer storage media as recited in claim 13, wherein $(f_{-j-k,P}f_{j,P}f_{k,P})=(f_{-j-k,P})+(f_{j,P})+(f_{k,P})=3(id)-((-j-k)P)-(jP)-(kP)$.

15. The computer storage media as recited in claim 14, wherein $f_{-j-k,P}(X)f_{j,P}(X)f_{k,P}(X)\text{line}(jP, kP, (-j-k)P)(X)=a$ constant.

16. The computer storage media as recited in claim 14, wherein if j is an integer and P a point on E, then said first and second functions are rational functions on E whose divisor of zeros and poles is $(f_{j,P})=j(P)-(jP)-(j-1)(id)$.

17. The computer storage media as recited in claim 14, further comprising determining $f_{0,P}$ such that a line through 0P=id, (−j−k)P, and (j+k)P is vertical in that it does not reference a y-coordinate.

18. The computer storage media as recited in claim 17, wherein:

$$f_{j+k,P}(X) = f_{j,P}(X)f_{k,P}(X)\frac{\text{line}(jP, kP, (-j-k)P)(X)}{\text{line}(id, (-j-k)P, (j+k)P)(X)}, \text{ and}$$

$$f_{j-k,P}(X) = \frac{f_{j,P}(X)\text{line}(id, jP, -jP)(X)}{f_{k,P}(X)\text{line}(-jP, kP, (j-k)P)(X)}.$$

19. The computer storage media as recited in claim 17, wherein:
   $f_{j,id}$=constant;
   $f_{j,-P}(X)=f_{j,P}(-X)*$(constant); and
   if (P+Q+R=id), then:

$$f_{j,P}(X)f_{j,Q}(X)f_{j,R}(X) = \frac{\text{line }(P, Q, R)(X)^j}{\text{line }(jP, jQ, jR)(X)}.$$

20. The computer storage media as recited in claim 13, wherein P and Q are m-torsion points on E and m is an odd prime, and wherein determining said Squared Weil pairing further includes:
   determining said squared Weil pairing based on $$\frac{f_{m,P}(Q)f_{m,Q}(-P)}{f_{m,P}(-Q)f_{m,Q}(P)} = e_m(P, Q)^2,$$

where $e_m$ denotes the Weil-pairing.

21. An apparatus comprising:
   memory configured to store information suitable for use with using a cryptographic process;
   a logic operatively coupled to the memory and configured to determine a Squared Weil pairing based on at least one elliptic curve;
   wherein the logic is further configured to establishing a point id that is defined as a point at infinity on E, and wherein P, Q, R, X are points on E wherein X is an indeterminate denoting an independent variable of a function, and wherein x(X), y(X) are functions mapping the point X on E to its affine x and y coordinates, and wherein a line passes through the points P, Q, R if P+Q+R=id;
   wherein the logic is further configured to determine a first function $f_{j,P}$ and a second function $f_{k,P}$ for two integers j and k, and a third function $f_{-j-k,P}$ based on the first and second functions;
   cryptographically process selected information stored in the memory based on the Squared Weil pairing;
   a display device coupled to the logic for outputting validation of selected information; and
   the logic determining a course of action in response to validation.

22. The apparatus as recited in claim 21, wherein said logic is further configured to determine an elliptic curve E over a field K, wherein E can be represented as an equation $y^2=x^3+ax+b$.

23. The apparatus as recited in claim 21, wherein $(f_{-j-k,P}f_{j,P}f_{k,P})=(f_{-j-k,P})+(f_{k,P})+(f_{k,P})=3(id)-((-j-k)P)-(jP)-(kP)$.

24. The apparatus as recited in claim 21, wherein $f_{-j-k,P}(X)f_{j,P}(X)f_{k,P}(X)\text{line}(jP, kP, (-j-k)P)(X)=a$ constant.

25. The apparatus as recited in claim 21, wherein if j is an integer and P a point on E, then the first and second functions are rational functions on E whose divisor of zeros and poles is $(f_{j,P})=j(P)-(jP)-(j-1)(id)$.

26. The apparatus as recited in claim 21, wherein the logic is further configured to determine $f_{0,P}$ such that a line through 0P=id, (−j−k)P, and (j+k)P is vertical in that it does not reference a y-coordinate.

27. The apparatus as recited in claim 26, wherein:

$$f_{j+k,P}(X) = f_{j,P}(X)f_{k,P}(X)\frac{\text{line}(jP, kP, (-j-k)P)(X)}{\text{line}(id, (-j-k)P, (j+k)P)(X)}, \text{ and}$$

$$f_{j-k,P}(X) = \frac{f_{j,P}(X)\text{line}(id, jP, -jP)(X)}{f_{k,P}(X)\text{line}(-jP, kP, (j-k)P)(X)}.$$

28. The apparatus as recited in claim 26, wherein:
   $f_{j,id}$=constant;
   $f_{j,P})(X)=f_{j,P}(-X)*$(constant); and
   if (P+Q+R=id), then:

$$f_{j,P}(X)f_{j,Q}(X)f_{j,R}(X) = \frac{\text{line }(P, Q, R)(X)^j}{\text{line }(jP, jQ, jR)(X)}.$$

29. The apparatus as recited in claim 21, wherein P and Q are m-torsion points on E and m is an odd prime, and wherein the logic is further configured to determine said squared Weil pairing based on $$\frac{f_{m,P}(Q)f_{m,Q}(-P)}{f_{m,P}(-Q)f_{m,Q}(P)} = -e_m(P, Q)^2,$$

where $e_m$ denotes the Weil-pairing.

30. A computer storage media having computer-implementable instructions for causing at least one processing unit to perform acts comprising:
determining a Squared Weil Pairing $e_m(P,Q)^2$ by:
establishing an odd prime m on a curve E;
based on two m-torsion points P and Q on E, computing $e_m(P, Q)^2$;
further comprising forming a mathematical chain for m selected from a group of mathematical chains comprising an addition chain and an addition-subtraction chain, such that every element in the mathematical chain is a sum or difference of two earlier elements in the mathematical chain, which continues until m is included in the mathematical chain;
wherein for each j in the mathematical chain, a tuple $t_j=[jP, jQ, n_j, d_j]$ is formed such that $$\frac{n_j}{d_j} = \frac{f_{j,P}(Q)f_{j,Q}(-P)}{f_{j,P}(-Q)f_{j,Q}(P)};$$

outputting validation of mathematical chain and
determining a course of action in response to validation of mathematical chain.

31. An apparatus comprising:
memory configured to store information suitable for use with using a cryptographic process;
a processor logic operatively coupled to the memory and configured to determine a Squared Weil Pairing $e_m(P, Q)^2$ by establishing an odd prime m on a curve E, and based on two m-torsion points P and Q on E, computing $e_m(P, Q)^2$;
wherein the processor logic is further configured to form a mathematical chain for m that is selected from a group of mathematical chains comprising an addition chain and an addition-subtraction chain;
wherein for each j in the mathematical chain, the logic is further configured to form a tuple $t_j=[jP, jQ, n_j, d_j]$ such that $$\frac{n_j}{d_j} = \frac{f_{j,P}(Q)f_{j,Q}(-P)}{f_{j,P}(-Q)f_{j,Q}(P)};$$

a display device coupled to the processor logic for outputting validation of cryptographic process; and
the processor logic determining a course of action in response to cryptographic process.

32. A method comprising:
determining a Squared Weil pairing (m, P, Q), where m is an odd prime number, by setting $t_1=[P, Q, 1, 1]$, using an addition-subtraction chain to determine $t_m=[mP, mQ, n_m, d_m]$, and if $n_m$ and $d_m$ are nonzero, then determining:

$$\frac{n_m}{d_m} = \frac{f_{m,P}(Q)f_{m,Q}(-P)}{f_{m,P}(-Q)f_{m,Q}(P)};$$

cryptographically processing selected information based on the Squared Weil pairing by:
generating product identification for selected information;
validating product identification for selected information;
outputting validation of product identification; and
determining a course of action in response to the validation.

33. A computer storage media having computer-implementable instructions for causing at least one processing unit to perform acts comprising:
determining a Squared Weil pairing (m, P, Q), where m is an odd prime number, by setting $t_1=[P, Q, 1, 1]$, using an addition-subtraction chain to determine $t_m=[mP, mQ, n_m, d_m]$, and if $n_m$ and $d_m$ are nonzero, then determining:

$$\frac{n_m}{d_m} = \frac{f_{m,P}(Q)f_{m,Q}(-P)}{f_{m,P}(-Q)f_{m,Q}(P)};$$

cryptographically processing selected information based on the Squared Weil pairing,
using the algorithm to encrypt, decrypt and validate product identification for selected information;
outputting validation of product identification for selected information; and
determining a course of action in response to the validation.

34. An apparatus comprising:
memory configured to store information suitable for use with using a cryptographic process;
a processor logic operatively coupled to said memory and configured to:
determine a Squared Weil pairing (m, P, Q), where m is an odd prime number, by setting $t_1=[P, Q, 1, 1]$,
use an addition-subtraction chain to determine $t_m=[mP, mQ, n_m, d_m]$,
if $n_m$ and $d_m$ are nonzero, then determine $$\frac{n_m}{d_m} = \frac{f_{m,P}(Q)f_{m,Q}(-P)}{f_{m,P}(-Q)f_{m,Q}(P)};$$

cryptographically process selected information based on the Squared Weil pairing by using the algorithm to encrypt, decrypt and validate selected information;
a display device coupled to the processor for outputting validation of selected information; and
the processor determining a course of action in response to the validation.

35. A method comprising:
selecting an elliptic curve;
determining a Squared Tate pairing based on the elliptic curve,
cryptographically processing selected information based on the Squared Tate pairing;
wherein m is an odd prime on K and P is an m-torsion point on E, Q is a point on E, with neither P nor Q being the identity and wherein P is not equal to a multiple of Q, and wherein E is defined over K, K has q=p'' elements, and m divides q−1, then determining that $$\left(\frac{f_{m,P}(Q)}{f_{m,P}(-Q)}\right)^{\frac{q-1}{m}} = v_m(P, Q),$$

where $v_m$ denotes the squared Tate-pairing;
outputting validation of selected information; and
determining a course of action in response to validation of selected information.

36. The method as recited in claim 35, wherein said elliptic curve includes an elliptic curve E over a field K, wherein E can be represented as an equation $y^2=x^3+ax+b$.

37. The method as recited in claim 35, wherein determining said Squared Tate pairing includes determining $v_m$(P, Q) by:
establishing an odd prime m and said elliptic curve E;
given an m-torsion point P on E and a point Q on E, determining a mathematical chain for m; and
for each j in said mathematical chain, forming a tuple $t_j=[jP, n_j, d_j]$ such that $$\frac{n_j}{d_j} = \frac{f_{j,P}(Q)}{f_{j,P}(-Q)}.$$

38. The method as recited in claim 37, further comprising:
starting with $t_1$=[P, 1, 1], given $t_j$ and $t_k$, determining $t_{j+k}$ by:
forming an elliptic curve sum jP+kP=(j+k)P,
determining line(jP,kP,(−j−k)P)(X)=c0+c1*x(X)+c2*y(X), and
setting: $n_{j+k}=n_j*n_k*(c0+c1*x(Q)+c2*y(Q))$ and $d_{j+k}=d_j*d_k*(c0+c1*x(Q)-c2*y(Q))$.

39. The method as recited in claim 38 further comprising determining $t_{j-k}$ from $t_j$ and $t_k$.

40. The method as recited in clam 39, wherein if j+k=m, then:
$n_{j+k}=n_j*n_k$ and $d_{j+k}=d_j*d_k$.

41. The method as recited in claim 39, wherein if $n_m$ and $d_m$ are nonzero, then:

$$\frac{n_m}{d_m} = \frac{f_{m,P}(Q)}{f_{m,P}(-Q)}.$$

42. The method as recited in claim 35, wherein said mathematical chain is selected from a group of mathematical chains comprising an addition chain and an addition-subtraction chain.

43. A computer storage media having computer-implementable instructions for causing at least one processing unit to perform acts comprising:
determining a Squared Tate pairing based on an elliptic curve;
cryptographically processing selected information based on the Squared Tate pairing;
wherein m is an odd prime on K and P is an m-torsion point on E, Q is a point on E, with neither P nor Q being the identity and wherein P is not equal to a multiple of Q, and wherein E is defined over K, K has q=p'' elements, and m divides q−1, then determining that $$\left(\frac{f_{m,P}(Q)}{f_{m,P}(-Q)}\right)^{\frac{q-1}{m}} = v_m(P, Q),$$

where $v_m$ denotes the squared Tate-pairing;
outputting validation of selected information; and
identifying a course of action in response to validation of selected information.

44. The computer storage media as recited in claim 43, wherein said elliptic curve includes an elliptic curve E over a field K, wherein E can be represented as an equation $y^2=x^3+ax+b$.

45. The computer storage media as recited in claim 43, wherein determining said Squared Tate pairing includes determining $v_m$(P, Q) by:
establishing an odd prime m and said elliptic curve E;
given an m-torsion point P on E and a point Q on E, determining a mathematical chain for m; and
for each j in said mathematical chain, forming a tuple $t_j=[jP, n_j, d_j]$ such that $$\frac{n_j}{d_j} = \frac{f_{j,P}(Q)}{f_{j,P}(-Q)}.$$

46. An apparatus comprising:
memory configured to store information suitable for use with using a cryptographic process;
a logic operatively coupled to the memory and configured to determine a Squared Tate pairing based on an elliptic curve; and cryptographically processing selected information based on the Squared Tate pairing;
wherein m is an odd prime on K and P is an m-torsion point on E, Q is a point on E, with neither P nor Q being the identity and wherein P is not equal to a multiple of Q, and wherein E is defined over K, K has q=p'' elements, and m divides q−1, then determining that $$\left(\frac{f_{m,P}(Q)}{f_{m,P}(-Q)}\right)^{\frac{q-1}{m}} = v_m(P, Q),$$

where $v_m$ denotes the squared Tate-pairing;
a display device coupled to the logic for outputting cryptographic process; and
the logic determining a course of action in response to cryptographic process.

47. The apparatus as recited in claim 46, wherein wherein said elliptic curve includes an elliptic curve E over a field K, wherein E can be represented as an equation $y^2=x^3+ax+b$.

48. The apparatus as recited in claim 46, wherein said logic is further configured to:

establish an odd prime m and said elliptic curve E;

given an m-torsion point P on E and a point Q on E, determine a mathematical chain for m; and for each j in said mathematical chain, form a tuple $t_j=[jP, n_j, d_j]$ such that $$\frac{n_j}{d_j} = \frac{f_{j,P}(Q)}{f_{j,P}(-Q)}.$$

* * * * *